(12) United States Patent
Satz et al.

(10) Patent No.: US 8,175,774 B2
(45) Date of Patent: May 8, 2012

(54) CAPACITIVE OBJECT RECOGNITION USING ADJUSTABLE ELECTRODE

(75) Inventors: Armin Satz, Arnoldstein (AT); Dirk Hammerschmidt, Villach (AT); Mario Motz, Wernberg (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 913 days.

(21) Appl. No.: 12/122,332

(22) Filed: May 16, 2008

(65) Prior Publication Data

US 2010/0145580 A1 Jun. 10, 2010

(51) Int. Cl.
*B62R 22/00* (2006.01)

(52) U.S. Cl. .......................................... 701/45; 280/735

(58) Field of Classification Search .................... 701/45, 701/47; 280/735
See application file for complete search history.

(56) References Cited

U.S. PATENT DOCUMENTS

| | | | |
|---|---|---|---|
| 5,617,031 A | 4/1997 | Tuttle | |
| 6,773,642 B1 | 8/2004 | Wardell | |
| 7,109,726 B2 | 9/2006 | van Berkel | |

FOREIGN PATENT DOCUMENTS

| | | |
|---|---|---|
| DE | 19812626 | 9/1999 |
| DE | 19847750 | 4/2000 |
| EP | 1080994 B1 | 3/2001 |
| EP | 1458588 B1 | 9/2004 |
| EP | 1622266 A1 | 2/2006 |
| EP | 1795402 A1 | 6/2007 |
| GB | 2284063 | 5/1995 |
| WO | 8908532 | 9/1989 |
| WO | 9521752 | 8/1995 |
| WO | 9729391 | 8/1997 |
| WO | 2004078536 A2 | 9/2004 |

*Primary Examiner* — Eric Culbreth
(74) *Attorney, Agent, or Firm* — Dicke, Billig & Czaja, PLLC

(57) ABSTRACT

A system for capacitive object recognition including a pair of electrodes, one of the electrodes having an adjustable parameter, and a controller modeling current pathways formed by interaction of an object with an electric field between the pair electrodes as a network of capacitors. The controller is configured to set the adjustable parameter to a first setting and to apply a set of alternating current voltages to the pair electrodes and measure a resulting first set of current values at each of the electrodes, configured to set the adjustable parameter to a second setting and apply the set of alternating current voltages to the pair of electrodes and measure a resulting second set of current values at each of the electrodes, and configured to determine values for up to all capacitors of the network of capacitors based on the first and second sets of current values.

26 Claims, 11 Drawing Sheets

EQ. I  $Z_1 = \dfrac{Y_2(Y_1 - Y_1 + Y_2 - Y_2)}{Y_1(Y_2 Y_1 - Y_1 Y_2)}$

EQ. II  $Z_2 = \dfrac{Y_1 - Y_1 + Y_2 - Y_2}{Y_2 Y_1 - Y_1 Y_2}$

EQ. III  $Z_3 = \dfrac{1}{Y_1 + Y_2} \dfrac{(Y_2 Y_1 - Y_1 Y_2 - Y_2 Y2 + Y_2 Y_2)}{(Y_2 Y_1 - Y_1 Y_2)}$ EQ. IV  $Z_4 = \dfrac{(Y_1 + Y_2)^2 - (Y_1 + Y_2)(Y_2 + Y_1)}{Y_3((Y_1 + Y_2)^2 - (Y_1 + Y_2)(Y_2 + Y_1)) - Y_1 \; (Y_1 Y_2 + Y_2 Y_2 - Y_1 Y_2 - Y_2 Y_2)}$ EQ. V  $\tilde{Z}_1 = \dfrac{\tilde{Y}_2(Y_1 - Y_1 + Y_2 + Y_2)}{Y_1(Y_2 Y_1 - Y_1 Y_2)}$ EQ. VI  $\tilde{Z}_4 = \dfrac{(Y_1 + Y_2)^2 - (Y_1 + Y_2)(Y_2 + Y_1)}{Y_3((Y_1 + Y_2)^2 - (Y_1 + Y_2)(Y_2 + Y_1)) - Y_1 \; (Y_1 Y_2 + Y_2 Y_2 - Y_1 Y_2 - Y_2 Y_2)}$

Fig. 7

|  | C1(pF) | C2(pF) | C3(pF) |
|---|---|---|---|
| DETERMINED BY FEM (INPUT DATA) | 11.2 | 13.9 | 62.5 |
| CALCULATED VIA ELECTRODE AREA VARIATION | 11.75 | 14.6 | 56.0 |
| % DIFFERENCE | 4.9% | 5.0% | 10.4% |

CAPACITIVE OBJECT RECOGNITION USING ADJUSTABLE ELECTRODE

BACKGROUND

Vehicles are commonly equipped with safety restraint systems, such as air bag systems, to protect passengers, including a driver and a front seat passenger, for example, in the case of an accident. Since it can be assumed that the driver's seat of a vehicle is occupied when the vehicle is in motion, it is generally desirable that an airbag on the driver's side be deployed if the vehicle is subjected to a deceleration above a certain threshold. However, the driver is often alone in the vehicle so that deployment of the passenger side air bag is unnecessary. In other cases, it is desirable to deactivate the passenger side air bag when the passenger seat is occupied by a child or rear-facing child safety seat, or when passengers have leaned forward prior to the moment of activation.

Accordingly, several techniques have been developed for determining an occupancy status of a vehicle seat for purposes of deactivating air bag systems, such as those situations described above. One such technique involves placing electrodes in the vehicle seat to sense the capacitance of an object positioned on the seat between the two electrodes, with a low capacitance indicating an object having a low dielectric constant, such as a passenger. However, conventional capacitive sensing systems ignore a direct coupling capacitance between the electrodes which may lead to inaccurate measurement data and undesirable ground dependent results, such as when an occupant bends forward on a seat, for example.

SUMMARY

One embodiment provides a system for capacitive object recognition including a pair of electrodes, one of the electrodes having an adjustable parameter, and a controller modeling current pathways formed by interaction of an object with an electric field between the pair electrodes as a network of capacitors. The controller is configured to set the adjustable parameter to a first setting and to apply a set of alternating current voltages to the pair electrodes and measure a resulting first set of current values at each of the electrodes, configured to set the adjustable parameter to a second setting and apply the set of alternating current voltages to the pair of electrodes and measure a resulting second set of current values at each of the electrodes, and configured to determine values for up to all capacitors of the network of capacitors based on the first and second sets of current values.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 7 illustrates equations representing a relationship between physical model capacitances and Y-model parameters according to one embodiment.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

According to embodiments described herein, an apparatus and method is provided for capacitively sensing and recognizing an object positioned at least partially between a pair of electrodes, wherein the sensing includes varying a physical parameter of at least one of the electrodes. In one embodiment, the physical parameter is a surface area of the electrode. In one embodiment, the physical parameter is a position of the electrode relative to the other electrode so as to vary a distance between the pair of electrodes. In one embodiment, as will be described in greater detail below, the electrodes are positioned within a vehicle seat so as to recognize the presence of objects in the seat, such as a human body, for example, in order to trigger safety devices, such as air bags or other restraint systems, when the seat is occupied.

Figure 1:
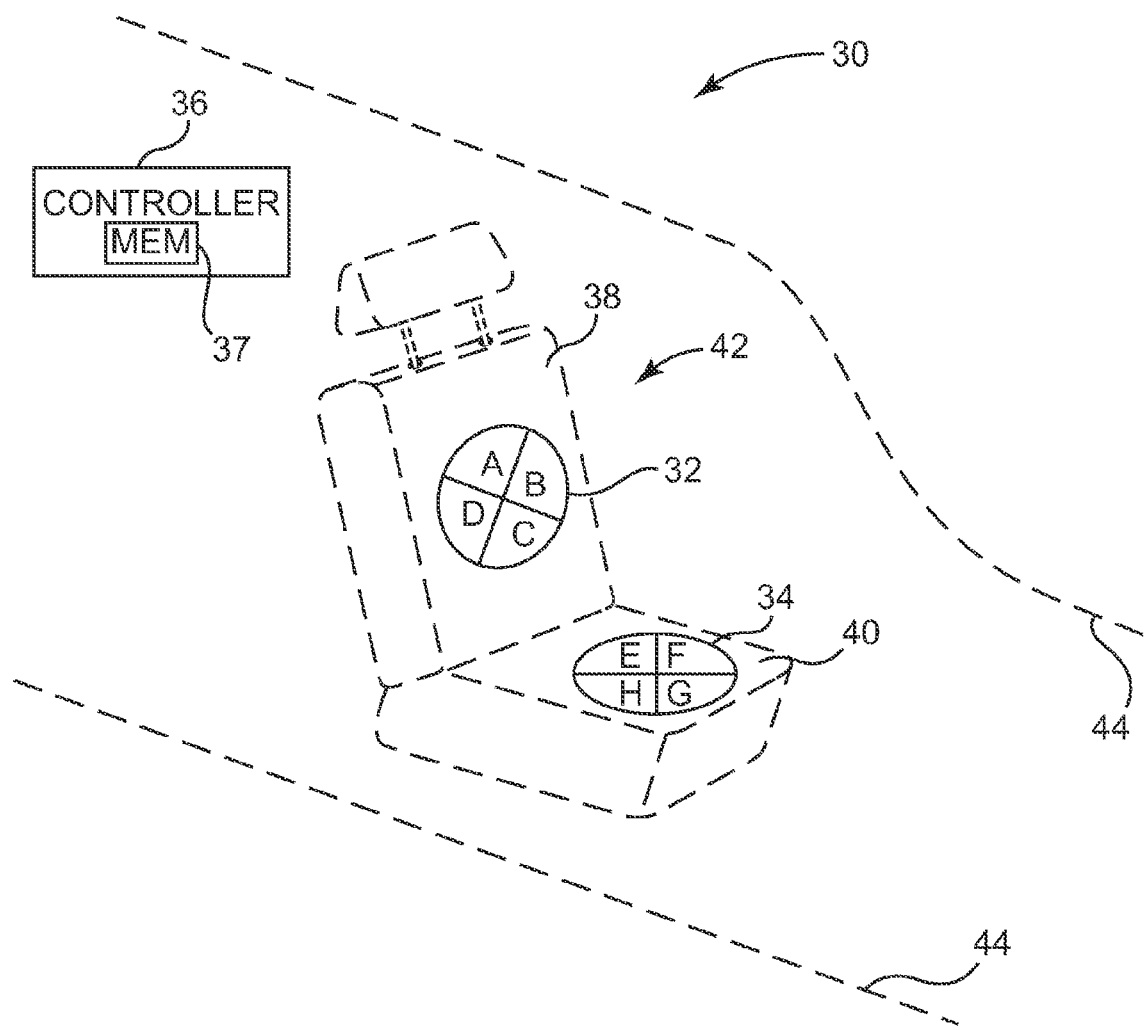
FIG. 1 is a block diagram generally illustrating a capacitive sensing system according to one embodiment.

FIG. 1 is a block and schematic diagram generally illustrating one embodiment of a sensing system 30 configured for capacitive object recognition, such as a human body, for example, in a vehicle seat. System 30 includes a first electrode 32 (E1), a second electrode 34 (E2), and a controller 36, with first electrode 32 positioned in a seat-back 38 and second electrode 34 positioned in a seat-bottom 40 of a seat 42 disposed in a car chassis or frame 44. In one embodiment, first electrode 32 includes a plurality of sub-electrodes or sub-plates, illustrated at A, B, C, and D, and second electrode 34 includes a plurality of sub-electrodes or sub-plates, illustrated at E, F, G, and H.

Figure 2:
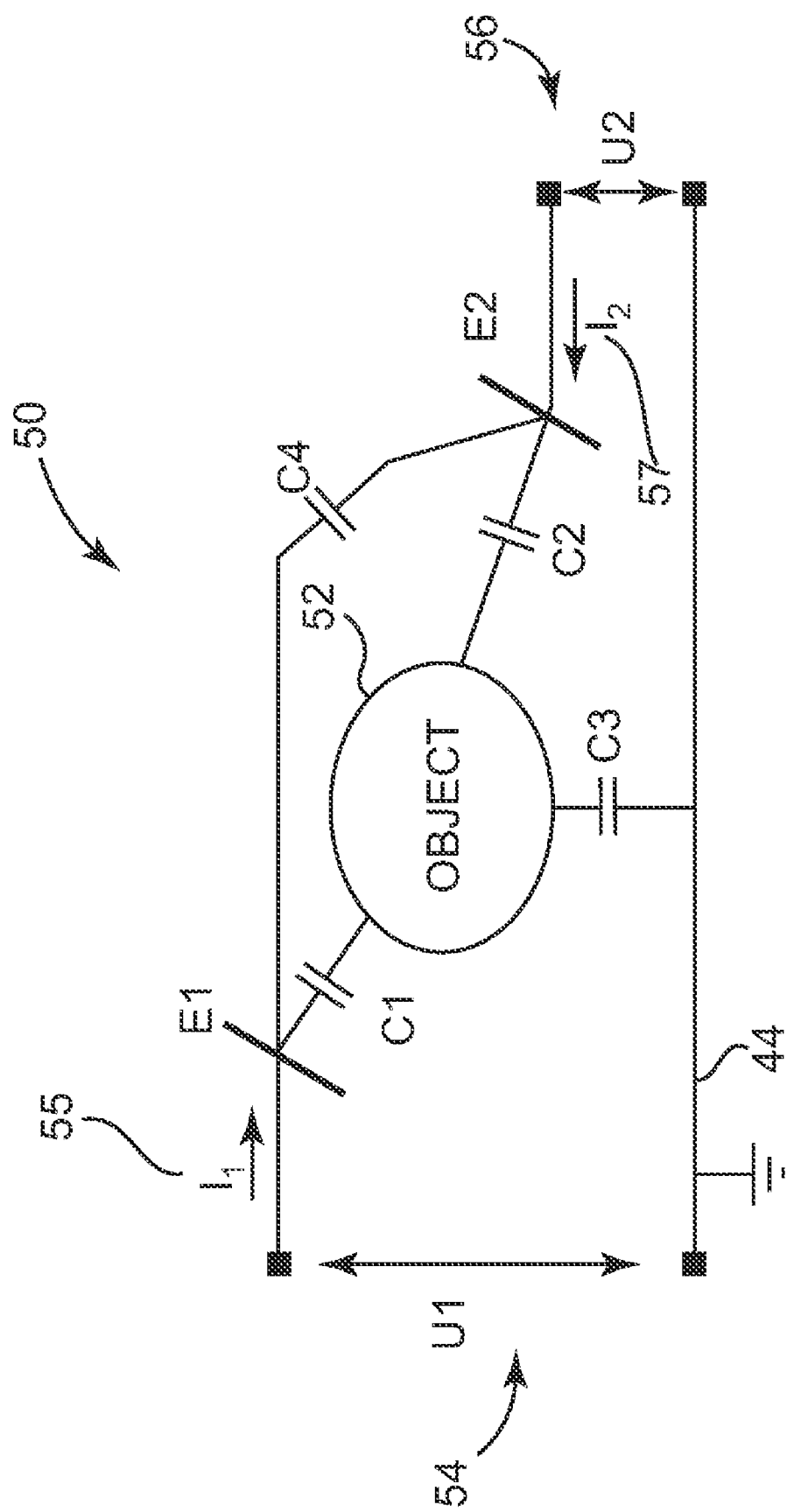
FIG. 2 is a schematic diagram illustrating a physical model of a portion of a capacitive sensing system according to one embodiment.

FIG. 2 is a schematic diagram of a physical model 50 which models significant current pathways resulting from interaction between an arbitrary object 52 and an electric field formed between electrodes 32 and 34 by application of alternating voltages thereto, such as by controller 36, as a network of lumped capacitances C1, C2, C3, and C4. First capacitor C1 represents a capacitive coupling between first electrode 32 and object 52, second capacitor C2 represents a capacitive coupling between second electrode 34 and object 52, third capacitor C3 represents a capacitive coupling between object 52 and frame 44, and fourth capacitor C4 represents the direct capacitive coupling between first and second electrodes 32 and 34.

Physical model 50 is an example of what is commonly known as a two-port network. In FIG. 2, frame 44 represents a reference or ground, with first electrode 32 and frame 44 forming a first or input port 54 (U1), and second electrode 34 and frame 44 forming a second or output port 56 (U2). As described in greater detail below, to determine or model the electrical characteristics (e.g. impedances) of a two-port network, AC voltages are applied to the input and output ports, such as ports 54 and 56, and the resulting currents $I_1$ and $I_2$, as indicated at 55 and 57, are measured.

Figure 3A:
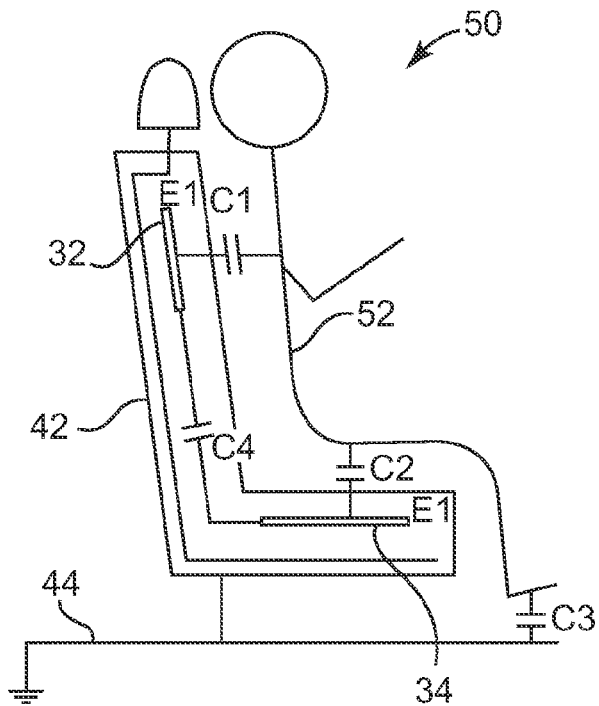
FIG. 3A is a schematic diagram illustrating a physical model of a portion of a capacitive sensing system for a vehicle seat according to one embodiment.

FIG. 3A represents physical model 50 where object 52 comprises a passenger seated on vehicle seat 42. When AC voltages having frequencies less than 1 MHz (e.g. in the KHz range) are applied to input and output ports 54 and 56, the intra-body impedance of the human body can be ignored and the human body can be treated as a short.

Figure 3B:
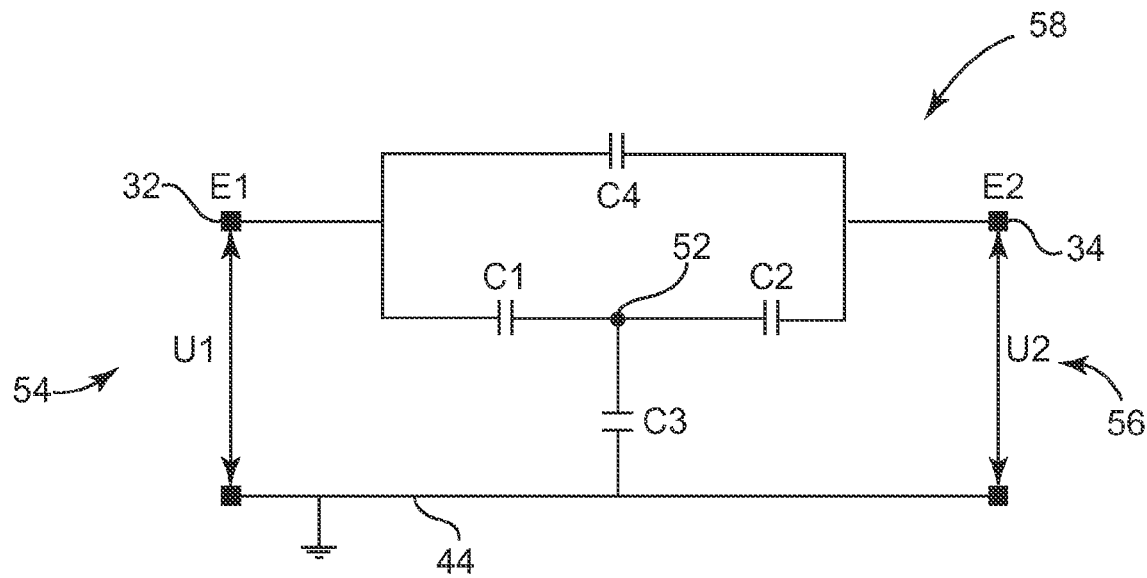
FIG. 3B is a schematic diagram of a network resulting from the physical model of FIG. 3A according to one embodiment.

FIG. 3B is a schematic diagram of a network 58 resulting from lumped network 50 of FIG. 3A when low-frequency AC voltages (e.g. 10 KHz) are applied at first or second input ports 54 and 56 by controller 36 such that human body 52 acts as an electrical short. As illustrated by network 58, first terminals of capacitors C1 and C2 are respectively coupled to first and second electrodes 32, with the second terminals of capacitors C1 and C2 being coupled to a first terminal of capacitor C3. A second terminal of capacitor C3 is coupled to frame or ground 44. Capacitor C4 is coupled between first and second electrodes 32 and 34. According to embodiments described in greater detail below, controller 36 applies low-frequency AC voltages to first and second electrodes 32 and 34 to determine the values of capacitors C1, C2, C3, and C4 and to determine the occupancy status of seat 42 therefrom.

As with physical model 50 of FIG. 2, network 58 of FIG. 3B is an example of what is commonly referred to as a passive, linear, two-port network. Any such two-port network can be defined or modeled as a network of three independent parameters. One such model is referred to as an admittance or Y-model.

Figure 4:
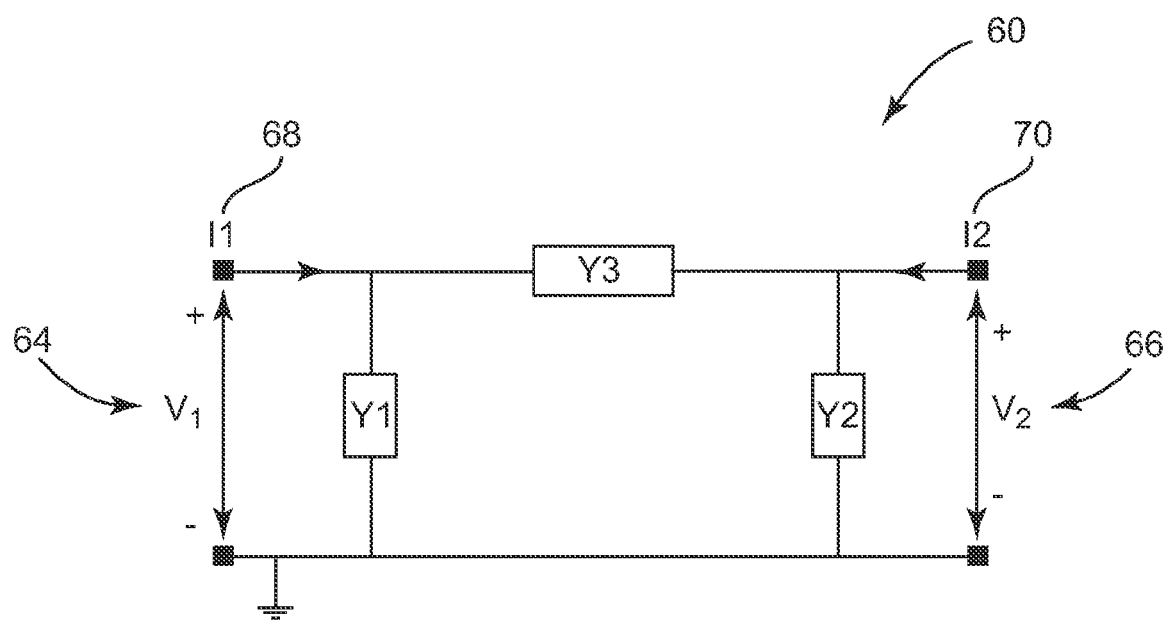
FIG. 4 is a schematic diagram generally illustrating a Y-model representation of a two-port network.

FIG. 4 is a schematic diagram generally illustrating an admittance or Y-model 60 representation of a two-port network, such as two-port network 58 of FIG. 3. Y-model 60 includes first and second ports 64 and 66, a first or input admittance Y1 coupled across first port 64, a second or output admittance Y2 coupled across second port 66, and a transfer admittance Y3 coupled between first and second ports 64 and 66. In a Y-model or admittance model, the input voltages at the ports are known and the admittance parameters can be found by measuring the resulting currents.

For example, the values of admittances Y1, Y2, and Y3 can be determined by applying a voltage $V_1$ at first port 64 with second port 66 shorted (i.e. $V_2=0$) and applying a voltage $V_2$ at second port 66 with first port 64 shorted (i.e. $V_1=0$) and measuring the values of resulting currents $I_1$ and $I_2$, as illustrated at 68 and 70. The values of admittances Y1, Y2, and Y3 can then be determined from the known values of $V_1$ and $V_2$ and the measured values of $I_1$ and $I_2$ using what is often referred to as a Y-matrix or Y-parameter matrix (not illustrated herein).

While the admittance or Y-model 60 enables the measurement of the three admittance parameters Y1, Y2, and Y3, the lumped network 50 according to the embodiment of FIGS. 2 and 3 requires the measurement of the values of the four capacitances C1, C2, C3 and C4. As such, a challenge exists in determining the four physical model parameters C1, C2, C3, and C4 from only three admittance parameters obtainable from the admittance model. Some conventional capacitive sensing systems avoid this challenge by simply ignoring the direct coupling capacitance between electrodes positioned in the seat, represented by the direct coupling capacitance C4 between first and second electrodes 32 and 34 respectively positioned in seat back 38 and seat bottom 40 of seat 42. However, such an approximation of a capacitive network is not valid if an occupant bends forward on a seat. Measurement data in such systems leads to undesirable ground dependent results for the C1 and C2 model parameters.

Unlike such conventional systems, capacitive sensing system 30 employs measurement techniques which obtain values of two sets of three admittance parameters (i.e. six admittance parameter values) using the admittance model equivalent of network 58 of FIG. 3A and FIG. 3B, wherein a physical parameter of one of the first and second electrodes 32 and 34 is adjusted between measurements. For example, in one embodiment, a first set of three admittance parameters is determined with first electrode 32 having a surface or electrode area set to a first value, and a second set of three admittance parameters is determined with electrode 32 having an electrode area set to a second value. Using these two sets of three admittance parameter values, controller 36 determines values of the four capacitances C1, C2, C3 and C4 of network 58 and determines an occupancy status of seat 42 based on one or more values the four capacitances C1, C2, C3 and C4, wherein the occupancy status is not influenced by the grounding status of object 52 (e.g. a person) with chassis or frame 44.

Figure 5A:
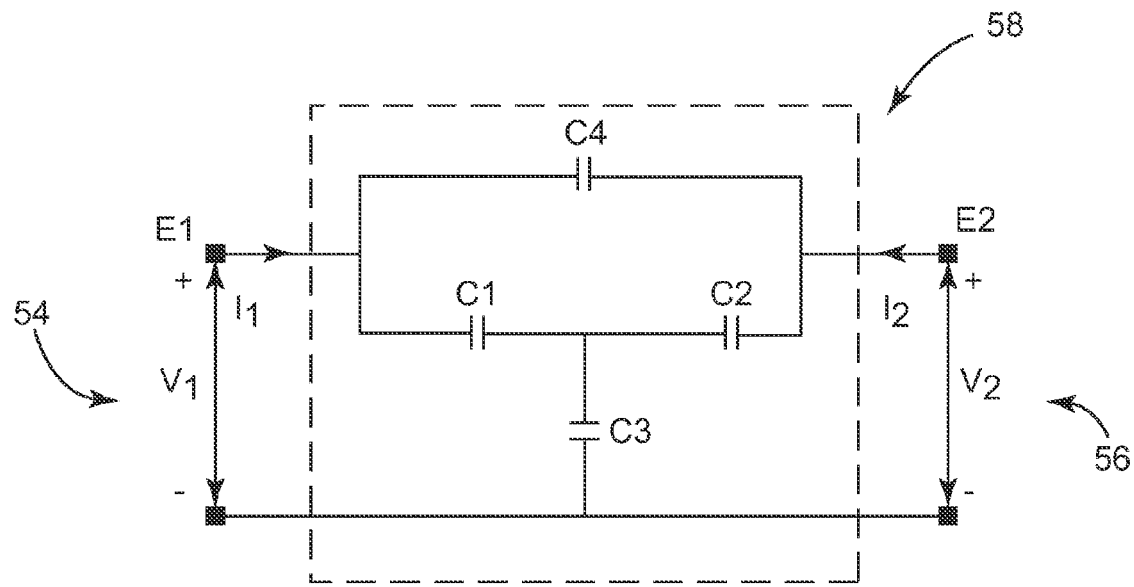
FIG. 5A is a schematic diagram of a capacitive network of FIG. 3B according to one embodiment.

FIGS. 5A through 7 below illustrate an example of one embodiment of a process employed by system 30 to determine an occupancy status of seat 42. FIG. 5A illustrates network 58 during a first measurement, where a surface area of first or seat-back electrode 32 is set by controller 36 to a first electrode or plate area, as indicated at E1, and second or seat-bottom electrode 34 is set to a first electrode or plate area, as indicated at E2. For example, in one embodiment, during a first measurement, controller 36 activates all sub-plates A, B, C and D to set first or seat-back electrode 32 to the first electrode or plate area, and activates all sub-plates E, F, G, and H to set seat-bottom to a first electrode or plate area. The corresponding capacitance values are indicated at C1, C2, C3, and C4.

Figure 5B:
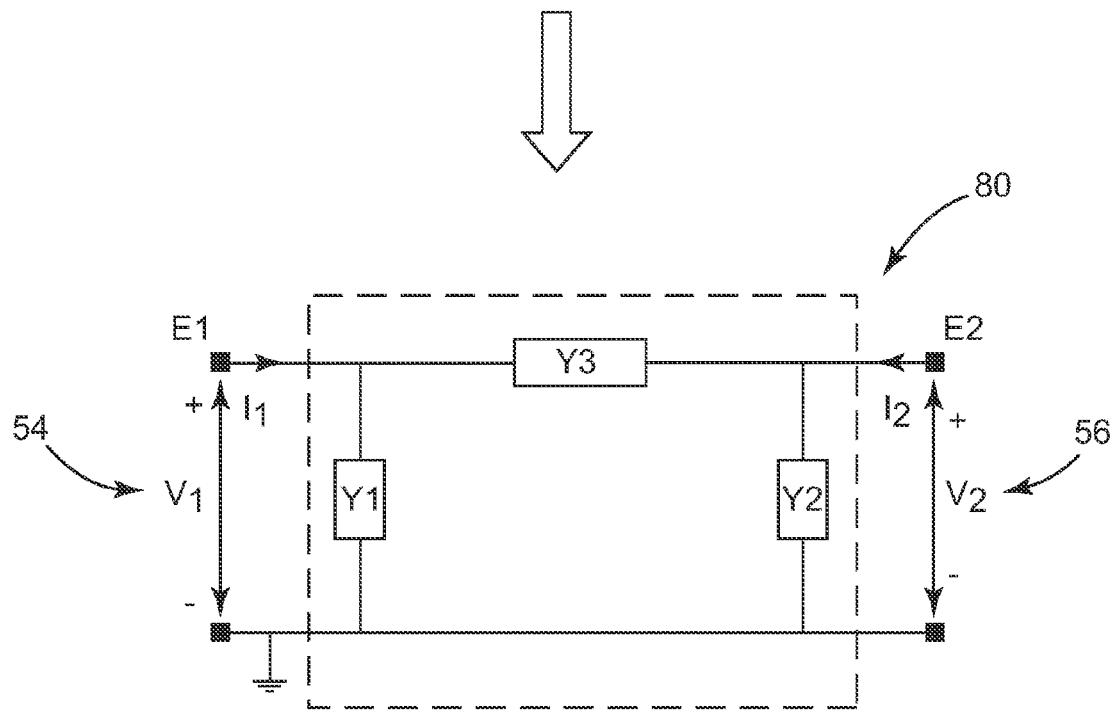
FIG. 5B is a Y-model representation of the network of FIG. 5A according to one embodiment.

FIG. 5B illustrates the Y- or admittance model 80 representation of network 58 having admittance parameters Y1, Y2, and Y3. In one embodiment, controller 36 determines the values of admittance parameters Y1, Y2, and Y3 by applying AC voltages $V_1$ and $V_2$ to ports 54 and 56, measuring the resulting currents $I_1$ and $I_2$, and employing a Y-parameter matrix as described above with respect to FIG. 4. In one embodiment, voltages $V_1$ and $V_2$ have a frequency less than 1 MHz. In one embodiment, voltages $V_1$ and $V_2$ have a frequency of 10 KHz.

Figure 6A:
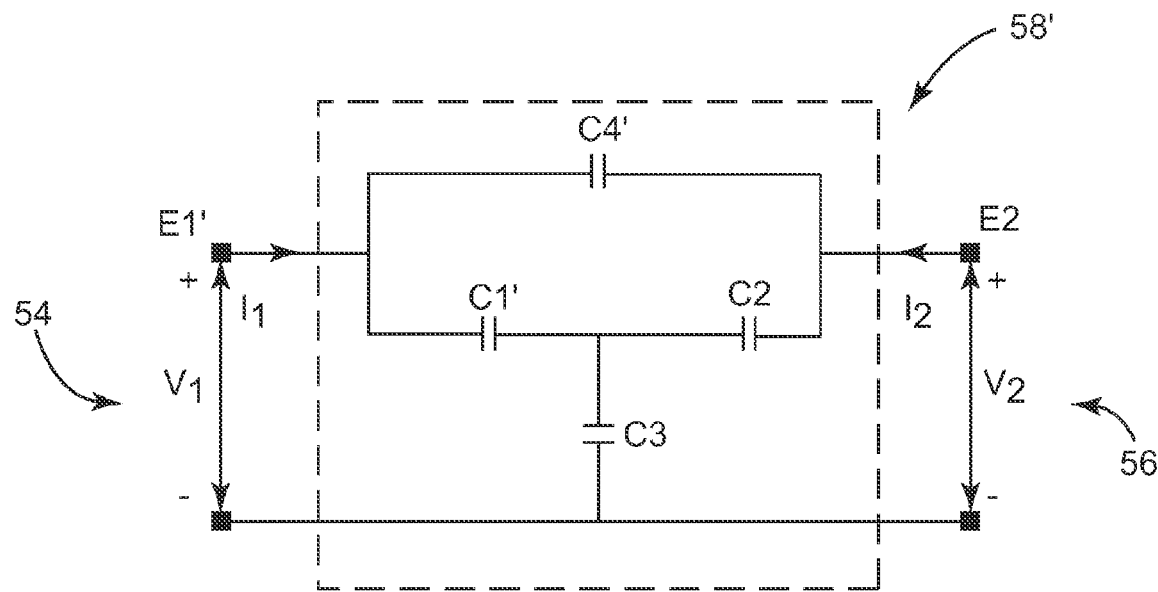
FIG. 6A is a schematic diagram of a capacitive network of FIG. 3B according to one embodiment.

FIG. 6A illustrates network 58' during a second measurement, where a surface area of first or seat-back electrode 32 is set by controller 36 to a second electrode or plate area, as indicated at E1', and second or seat-bottom electrode 34 remains set at the first electrode or plate area, again as indicated at E2. For example, in one embodiment, controller 36 activates only sub-plates A and B of first or seat-back electrode 32 while all sub-plates E, F, G, and H of seat-bottom electrode 34 continue to be activated by controller 36 during the second measure measurement. The associated capacitance values are indicated at C1', C2, C3, and C4'.

Figure 6B:
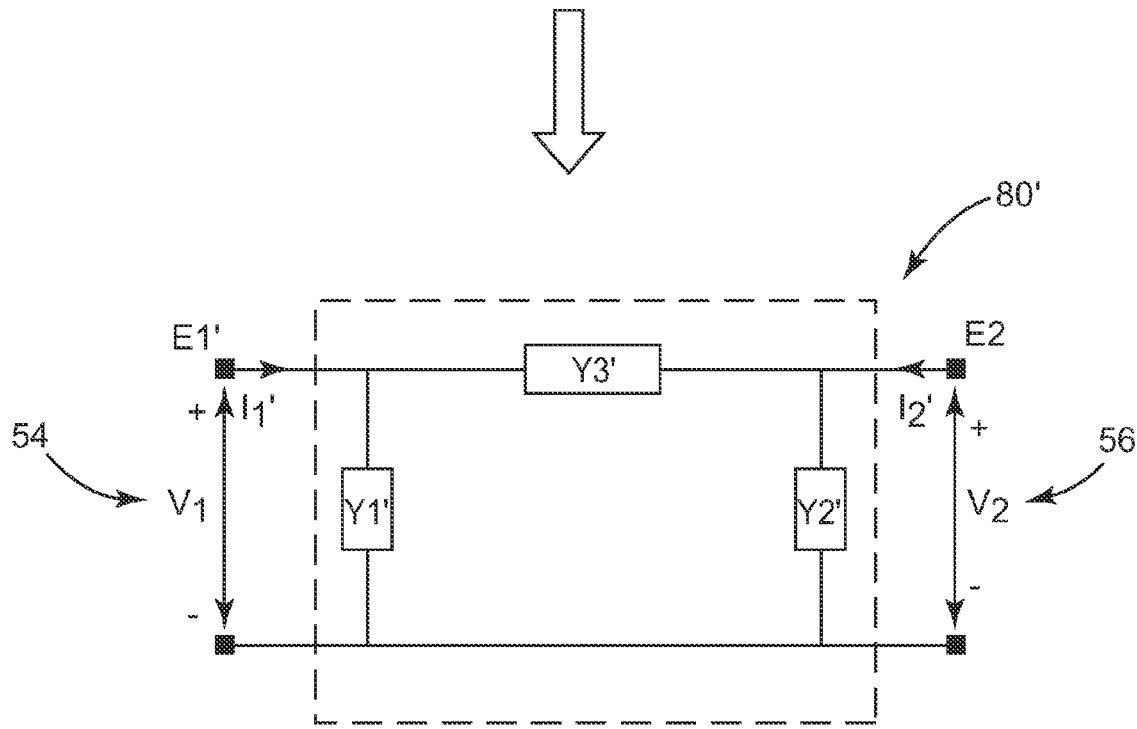
FIG. 6B is a Y-model representation of the network of FIG. 6A according to one embodiment.

Note that by changing the electrode or plate area of first electrode E1, the values of coupling capacitances associated with first electrode E1 vary between network 58' of FIG. 5A and network 58' of FIG. 6B, as indicated by C1' and C4'. If the plate area of second electrode E2 is varied in lieu of first electrode E1, the values of coupling capacitances C2 and C3 associated with first electrode E1 would vary rather than coupling capacitances C1 and C4. As will be described in greater detail below, it is assumed that the varying of the plate area of the one electrode affects neither the grounding of object 52 (i.e. coupling capacitance C3) nor the coupling capacitance of the non-varied electrode (either coupling capacitance C1 or C2).

FIG. 6B illustrates the Y- or admittance model 80' representation of network 58' having admittance parameters Y1', Y2', and Y3'. Again, controller 36 determines the values of admittance parameters Y1', Y2', and Y3' by applying AC voltages $V_1$ and $V_2$ to ports 54 and 56, measuring the resulting currents $I_1'$ and $I_2'$, and employing a Y-parameter matrix as described above with respect to FIG. 4.

Controller 36 then determines the values of capacitances C1, C2, C3, and C4 of network 50 based on the values of admittance parameters Y1, Y2, Y3, Y1', Y2', and Y3', as described above. In one embodiment, the relationships between the capacitance values C1, C2, C3, C4, C1', and C4' the six measured admittance parameters Y1, Y2, Y3, Y1', Y2', and Y3' obtained from varying the plate area of first electrode 32 are described by Equations I through VI of FIG. 7. Using, the six unknown capacitance values C1, C2, C3, C4, C1', and C4' are determined from the six measured admittance parameters Y1, Y2, Y3, Y1', Y2', and Y3' obtained from varying the plate area of first electrode 32.

Subsequently, controller 36 determines an occupancy status of seat 42 based on the values of capacitances C1, C2, C3, and C4. In one embodiment, controller 36 determines the occupancy by comparing the values of capacitances C1, C2, C3, and C4 to known or previously determined values of C1, C2, C3, and C4. For example, in one embodiment, a value of one of the capacitances C1, C2, C3, and C4 being within a predetermined range of values is indicative of the presence of a human body in seat 42. In one embodiment, a value of C1 being within a first predetermined range is indicative of a child sitting on seat 42 (e.g. a child's head or back may not contact or contact only a portion of first electrode 32) and being within a second predetermined range is indicative of an adult sitting on seat 42 (e.g. an adult's head or shoulders fully contacts first electrode 32). In one embodiment, the values of one or more of the capacitances C1, C2, C3, and C4, each being within a corresponding predetermined range of values is indicative of a particular object being positioned on seat 42, such as a human body, a child's car safety seat, or other inanimate object, for example.

As described above, based on the values of one or on a combination of one or more of the capacitances C1, C2, C3, and C4, not only is system 30 able to determine whether seat 42 is occupied, system 30 is able to identify or recognize the type of object 52 which is occupying seat 42. In one embodiment, various objects 52 (such as adult persons, children, child safety seats, and luggage, for example) are placed in seat 42 under various conditions (e.g. different humidity and temperature conditions, dry seat covers, damp seat covers) and corresponding ranges of capacitance values for each of the capacitances C1, C2, C3, C4, C1', and C4' are determined to develop a data base of capacitance values for the various objects. In one embodiment, such a data base is stored in a memory 37 within controller 36 and accessed when determining an occupancy status of seat 42.

In one embodiment, based on the occupancy status of seat 42, controller 36 controls, adjusts, or provides outputs to one or more systems (e.g. safety systems, air conditioning zones, seat heating systems) within a vehicle in which seat 42 is located. For example, in one embodiment, controller 36 activates an air bag system associated with seat 42 when capacitance values C1, C2, C3, and C4 indicate the presence of an adult in seat 42. In one embodiment, controller 36 de-activates such an air bag system when capacitance values C1, C2, C3, and C4 indicate the presence of a child safety seat positioned on seat 42.

In one embodiment, controller 36 is a dedicated controller for use with system 30. In one embodiment, controller 36 is associated with and performs functions for other systems or features of a vehicle in which system 30 is employed. In one embodiment, controller 36 determines the values of capacitances C1, C2, C3, and C4 in an on-going basis upon ignition of a vehicle in which system 30 is employed. In one embodiment, controller 36 determines an occupancy status of seat 42 upon initial start-up of the vehicle and checks the occupancy status periodically thereafter.

Figure 8:
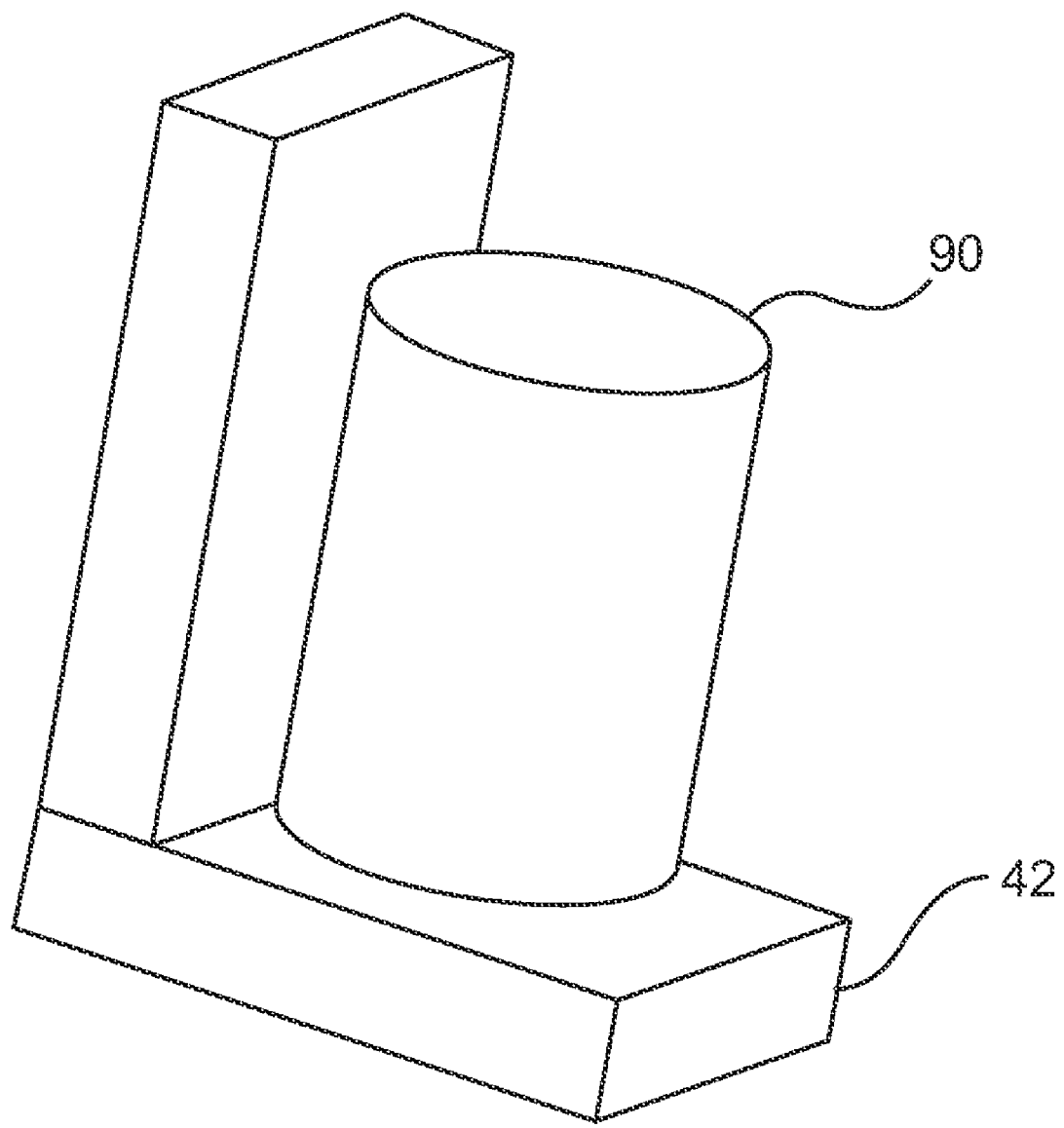
FIG. 8 is a diagram generally illustrating a model of a seat and a cylindrical object thereon for a finite element method simulation according to one embodiment.

As mentioned earlier, when applying technique of varying a physical parameter of one of the electrode plates, such as the electrode or plate area of first electrode 32 as described above, it is assumed that the varying of the plate area of one electrode will influence neither the grounding of object 52 (i.e. capacitance C3 in FIGS. 2 and 3) nor the coupling capacitance of the non-varied electrode (i.e. capacitance C2 in FIGS. 2 and 3). As described by FIGS. 8 through 10 below, the validity of this assumption was verified by performing a finite element analysis (FEM) simulation which included modeling of seat 42, along with electrodes 32 and 34, and modeling an object positioned on seat 42 as a cylindrical body 90.

Figure 9A:
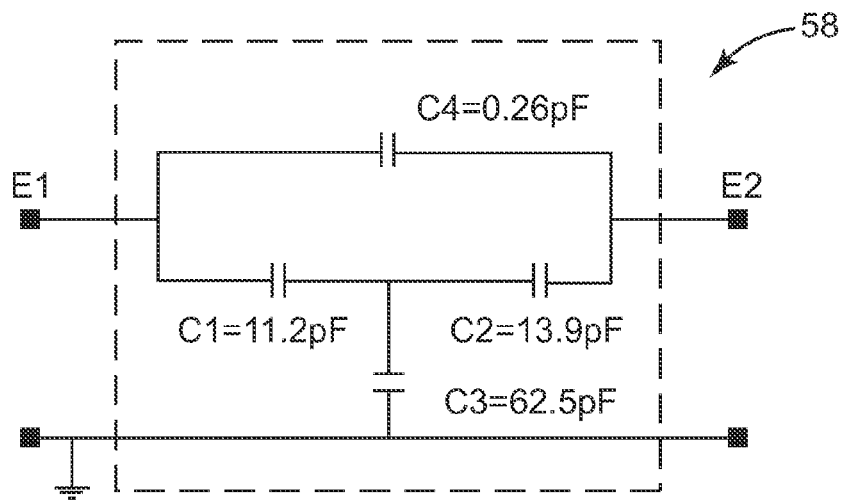
FIG. 9A is a diagram illustrating example capacitive values determined by a finite element method simulation according to one embodiment.

According to the simulation, values of physical model capacitances C1, C2, C3, and C4 were first calculated using FEM techniques with AC voltages modeled at first and second electrodes 32, 34 and with first electrode 32 being modeled with a first electrode area, similar to that illustrated by network 58 of FIG. 5A. FIG. 9A illustrates the calculated values of model capacitances C1, C2, C3, and C4 for the simulated embodiment of system 30, with capacitances C1, C2, C3, and C4 respectively having FEM calculated values of 11.2 pF, 13.9 pF, 62.5 pF, and 0.26 pF.

Figure 9B:
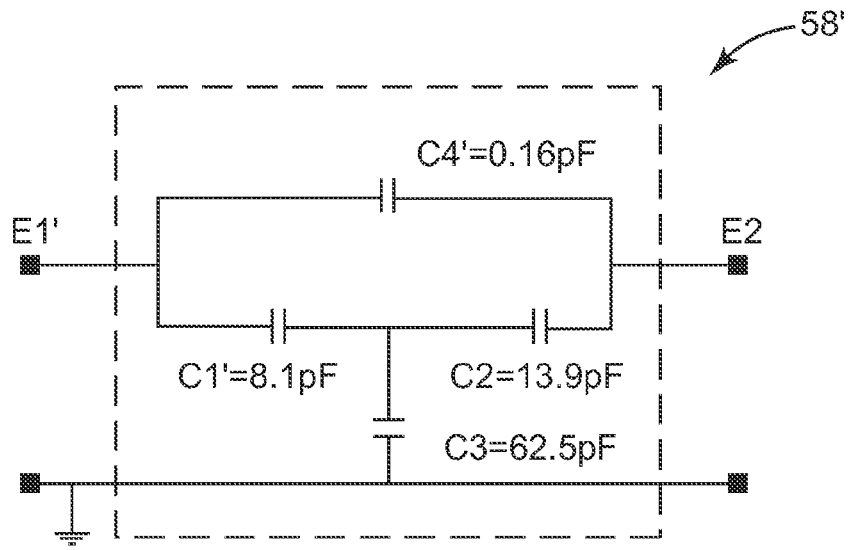
FIG. 9B is a diagram illustrating example capacitive values determined by a finite element method simulation according to one embodiment.

Next, physical model capacitance values were calculated using FEM techniques with first electrode 32 being modeled at a second electrode or plate area (i.e. an adjusted or varied plate area), similar to that illustrated network 58' of FIG. 6A. FIG. 9B illustrates the calculated values of model capacitances C1', C2, C3, and C4' for the simulated embodiment of FIG. 30 with capacitances C1', C2, C3, and C4' respectively having calculated values of 8.1 pF, 13.9 pF, 63.5 pF, and 0.16 pF.

When comparing the calculated values of FIG. 9B to those of FIG. 9A, it is noted that the values of C1 and C1' and the values of C4 and C4' vary as expected, and the value of C2 remains constant as expected. However, the simulation indicates a slight variation in the value of ground coupling capacitance C3, which is assumed to be unaffected by the variation of the electrode area of first electrode 32. As described below, such a variation results in errors in the values of the physical model capacitances C1, C2, C3, and C4 calculated according to the techniques described herein.

Returning to the FEM simulation, the calculated values of C1, C2, C3, and C4 of FIG. 9A were then transformed to impedances and, based on the AC voltages employed in the simulation, the resulting currents at each of the ports and Y-parameters Y1, Y2, and Y3 determined. Similarly, the calculated values of C1', C2, C3, and C4' of FIG. 9B were transformed to impedances and, based on the AC voltages employed in the simulation, the resulting currents at each of the ports and Y-parameters Y1', Y2', and Y3' determined. From these values of Y1, Y2, Y3, Y1', Y2', and Y3', the model capacitances C1, C2, C3, C4, C1', and C4' were calculated using Equations I through VI of FIG. 7.

Figures 10, 11:
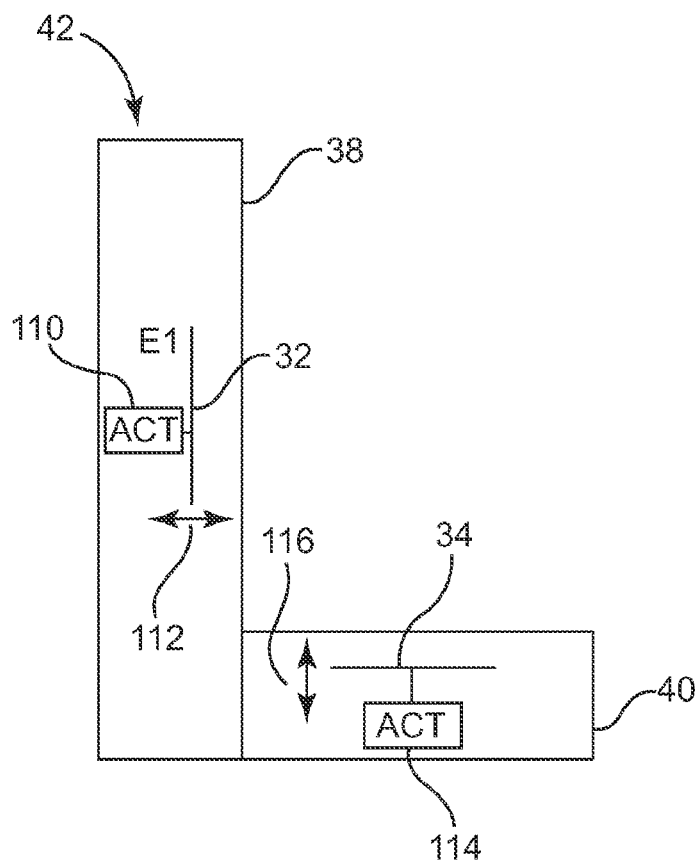
FIG. 10 is a table illustrating example capacitive values of the finite element method simulation of FIGS. 8, 9A, and 9B.
FIG. 11 is a block diagram generally illustrating electrodes positioned within a vehicle seat according to one embodiment.

FIG. 10 is a table 100 illustrating values of capacitances C1, C2, and C3 for the above described FEM simulation. A first row 102 illustrates "input data" which comprise FEM-calculated values. A second row 104 illustrates values calculated using the electrode variation techniques described herein (i.e. using Y-model parameters and Equations I through VI). A third row 106 illustrates the percentage difference between the "input values" and those calculated using electrode area variation techniques. As mentioned above, these errors result from the fact that, although assumed to be unaffected by the variation of the electrode area of first electrode E1, there is, in fact, a small variation in the coupling capacitance C3 when the electrode area of first electrode E1 is adjusted from the first electrode area to the second electrode area.

However, through configuration of system 30, including sizing the electrode areas of first and second electrodes 32, 34 and their positioning within seat 42, for example (which can be modeled using the above described FEM techniques, for example), variations in the value of coupling capacitance C3 can be minimized, or at least be kept within acceptable limits. Limiting or minimizing variations of coupling capacitance C3, in-turn, reduces the errors in the determined values of the physical model capacitances C1, C2, C3 and C4 determined using the electrode variation techniques described herein.

According to one embodiment, for example, configuring a set-up of first and second electrodes 32 and 34 (e.g. electrode areas and positioning within seat 42) such that a variation of the electrode area of first electrode 32 provides a 30-50% variation in values of C1 and C4 and unwanted variations in values of C2 and C3 of not more than 1% provides accurate results using the electrode variation techniques described herein. Such configurations can be verified prior to actual assembly and testing using the above described FEM simulation techniques.

Although described above primarily in terms of determining an occupancy status of a vehicle seat, the techniques employed by system 30 can be readily adapted for object detection in other applications as well. Additionally, although described above in terms of varying the electrode or plate area of one of the first and second electrodes 32 and 34, similar results can be achieved by varying a position of one of the electrodes 32 and 34 in lieu of varying the electrode or plate area. For example, as illustrated by FIG. 11, a position of first or seat-back electrode 32 may be varied between measurements via an actuating means 110, as illustrated by the directional arrow at 112, and a position of second or seat-bottom electrode 34 may be varied between measurements via an actuating means 114, as illustrated by the direction arrow at 116. In one embodiment, varying a position of first electrode 32 between measurements enables determination of the six Y-parameters Y1, Y2, Y3, Y1', Y2', and Y3' and, in-turn, the determination of capacitances C1, C2, C3, and C4, as described above.

Figure 12:
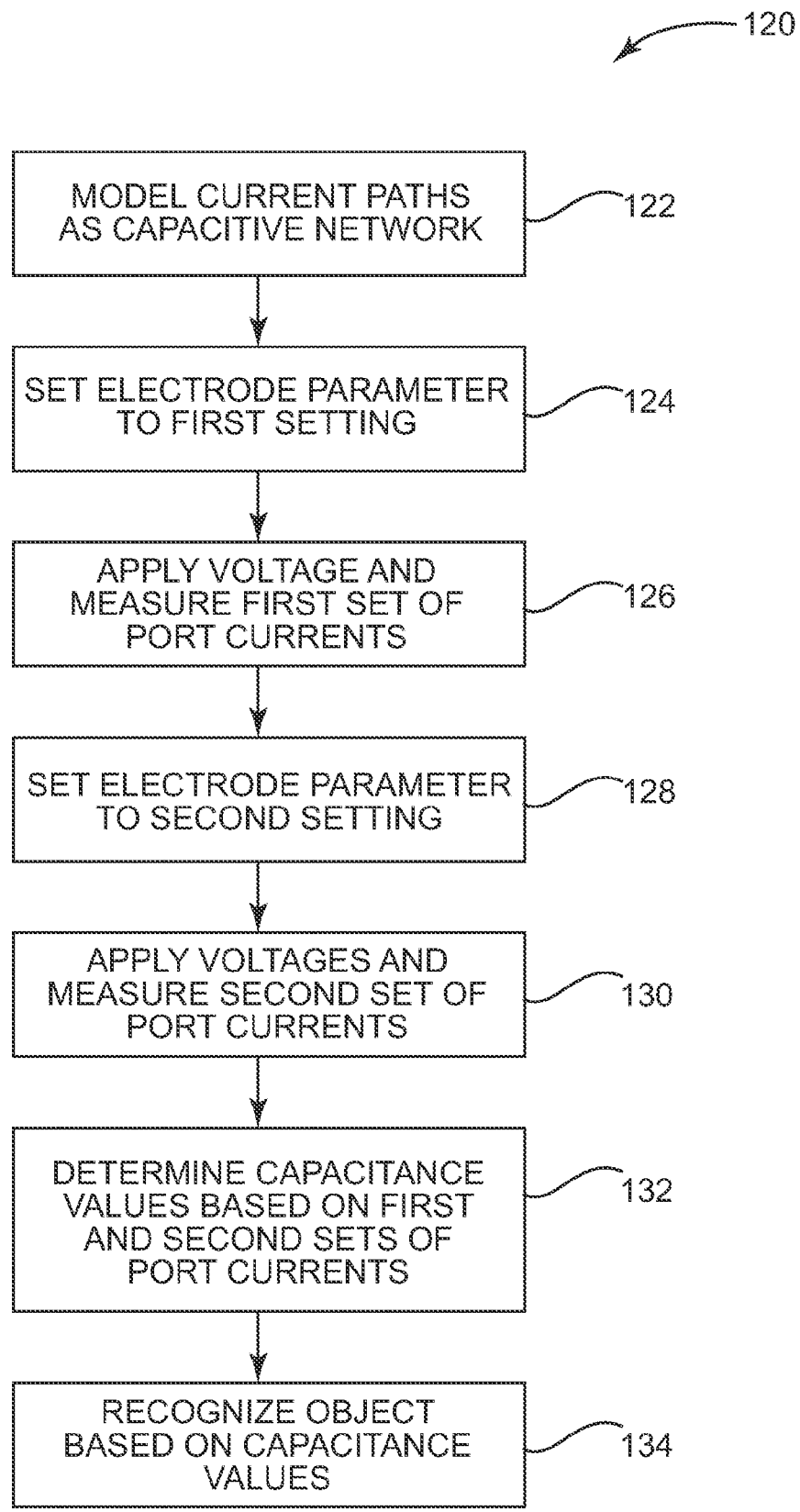
FIG. 12 is a flow diagram generally illustrating one embodiment of a process for capacitive object recognition employing electrode variation according to one embodiment.

FIG. 12 is a flow diagram generally illustrating a process 120 for capacitive object between a pair of electrodes employing electrode variation according to one embodiment. Process 120 begins 122 by modeling current pathways formed by interaction of the object with an electric field between the pair of electrodes as a network of capacitors, with a first port between a first one of the electrodes and a reference (e.g. ground) and a second port between a second one of the electrodes and the reference. In one embodiment, the capacitive network comprises a network of four capacitors. In one embodiment, the four capacitors include a coupling capacitance between the first electrode and the object, a coupling capacitance between the second electrode and the object, a coupling capacitance between the first and second electrodes, and a coupling capacitance between the object and the reference.

Process 120 continues at 124 by setting an adjustable parameter of the first electrode to a first setting. In one embodiment, the adjustable parameter comprises an electrode or plate area of the first electrode. In one embodiment, the adjustable parameter comprises a position of the first electrode relative to the second electrode.

At 126, a set of AC voltages are applied to the first and second electrodes and a resulting first set of current values at the first and second ports are measured. In one embodiment, the set of AC voltages has a frequency less than 1 MHz. In one embodiment, the AC voltages have a frequency of 10 KHz.

Process 120 continues at 128 by setting the adjustable parameter of the first electrode to a second setting. At 130, the set of voltage is again applied to the first and second electrodes and a resulting second set of current values at the first and second ports are measured.

At 132, the values of the capacitors of the capacitive network modeled of 122 are determined based on the first and second sets of current values determined at 126 and 130. In one embodiment, determining the values of the capacitors includes determining a first set of Y-parameters of a first Y-model equivalent of the capacitive network of 122 with the first electrode at the first setting based on the first set of current values, determining a second set of Y-parameters of a second Y-model equivalent of the capacitive network of 122 with the first electrode at the second settings based on the second set of current values, and determining values of the four capacitors of the capacitive network based on a relationship between the capacitors of the capacitive network and the first and second sets of Y-parameters (such as Equations I through VI of FIG. 7).

At 134, a presence of an object is identified between the first and second electrodes based on one or more of the capacitive values determined at 132. In one embodiment, the presence of an object is identified by comparing the capacitive values determined at 132 to predetermined capacitive values which are indicative of correspond to different types of objects (such as a human body, for example).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system for capacitive object recognition comprising:
a pair of electrodes, one of the electrodes having an adjustable parameter; and
a controller modeling current pathways between the pair of electrodes and potential current pathways between an external object and at least the pair of electrodes formed by interaction of the external object with an electric field between the pair electrodes as a network of capacitors, the controller configured to set the adjustable parameter to a first setting and to apply a set of alternating current voltages simultaneously to the pair of electrodes and measure a resulting first set of current values at each of the electrodes, configured to set the adjustable parameter to a second setting and apply the set of alternating current voltages simultaneously to the pair of electrodes and measure a resulting second set of current values at each of the electrodes, configured to determine values for up to all capacitors of the network of capacitors based on the first and second sets of current values; and configured to sense the presence of and identify the external object based on determined values of one or more of the capacitors of the network of capacitors.

2. The system of claim 1, wherein the adjustable parameter comprises a surface area, and wherein the first setting comprises a first surface area and the second setting comprises a second surface area which is different from the first surface area.

3. The system of claim 1, wherein the adjustable parameter comprises a position of the first electrode relative to the object and to the second electrode.

4. The system of claim 1, wherein the controller is configured to recognize the object by comparing the values of one or more of the capacitors of the network of capacitors to a plurality of predetermined values for each of the one or more capacitors.

5. The system of claim 1, wherein the alternating current voltages have a frequency less than one megahertz such that when the object is a human body, the human body acts substantially as an electrical short.

6. The system of claim 1, wherein the network of capacitors includes a first capacitor representing a coupling capacitance between the first electrode and the object, a second capacitor representing a coupling capacitance between the second electrode and the object, a coupling capacitance between the object and a reference, and a coupling capacitance between the first and second electrodes.

7. The system of claim 1, wherein the controller is configured to determine a first set of three parameters of a two-port model representation of the network of capacitors from the first set of current values and a second set of three parameters of a two-port model representation of the network of capacitors from the second set of current values, and wherein the controller is configured to determine values for capacitors of the network of capacitors from the first and second sets of parameters.

8. A method of capacitive object recognition comprising:
modeling current pathways formed by interaction of an object and an electric field between a pair of electrodes as a network of capacitors;
adjusting a parameter of one electrode of the pair of electrodes to a first setting;
applying a set of alternating current voltages to the pair of electrodes and measuring a resulting first set of current values at the pair of electrodes;
adjusting the parameter of the one electrode to a second setting;
applying the set of alternating current voltages to the pair of electrodes and measuring a resulting second set of current values at the pair of electrodes;
determining values for up to all capacitors of the network of capacitors based on the first and second sets of current values; and
sensing the presence of and recognizing the object based on the value of one or more of the capacitors of the network of capacitors.

9. The method of claim 8, wherein adjusting the parameter includes adjusting a surface area of the one electrode.

10. The method of claim 8, wherein adjusting the parameter includes adjusting a position of the one electrode relative to the object and to the other electrode of the pair of electrodes.

11. The method of claim 8, wherein recognizing the object includes comparing the values of one or more of the capacitors of the network of capacitors to a plurality of predetermined values for each of the one or more capacitors.

12. The system of claim 8, wherein modeling current pathways includes modeling the network of capacitors as a first capacitor representing a coupling capacitance between one electrode of the pair and the object, a second capacitor representing a coupling capacitance between the other electrode of the pair and the object, a coupling capacitance between the object and a reference, and a coupling capacitance between the pair of electrodes.

13. The method of claim 8, wherein determining values for up to all capacitors of the network of capacitors includes:
determining a first set of three parameters of a two-port model representation of the network of capacitors from the first set of current values;
determining a second set of three parameters of a two-port model representation of the network of capacitors from the second set of current values; and
determining values for the capacitors of the network of capacitors based on a relationship between the first and second sets of parameters and the capacitors of the network of capacitors.

14. A vehicle seat occupant recognition system comprising:
a first electrode positioned in one of a seat back and seat bottom of a vehicle seat, the first electrode having an adjustable parameter;
a second electrode positioned in the other of the seat back and seat bottom; and
a controller modeling current pathways formed by interaction of an object and an electric field between the first and second electrodes as a network of capacitors, the controller configured to set the adjustable parameter to a first setting and to apply a set of alternating current voltages to the first and second electrodes and measure a resulting first set of current values at the first and second electrodes, configured to set the adjustable parameter to a second setting and apply the set of alternating current voltages to the first and second electrodes and measure a resulting second set of current values at the first and second electrodes, and configured to determine values for up to all capacitors of the network of capacitors based on the first and second sets of current values, wherein the controller determines an occupancy status of the vehicle seat based on the value of one or more of the capacitors.

15. The system of claim 14, wherein the adjustable parameter comprises one of a surface area of the first electrode and a position of the first electrode relative to the object and to the second electrode.

16. The system of claim 14, wherein the controller determines the occupancy status by comparing the value one or more of the capacitors to predetermined values for the capacitors.

17. The system of claim 16, wherein the controller activates a vehicle system based on the occupancy status.

18. The system of claim 17, wherein the vehicle system comprises a safety system associated with the vehicle seat.

19. The system of claim 14, wherein the network of capacitors comprises a coupling capacitance between the first electrode and the object, a coupling capacitance between the second electrode and the object, a coupling capacitance between the first and second electrodes, and a coupling capacitance between the object and a chassis of the vehicle, and wherein the alternating voltages have a frequency of less than one megahertz so that when the object is a human body, the human body acts substantially as an electrical short.

20. The system of claim 19, wherein the controller is configured to determine a first set of three parameter values of a two-port model representation of the network of capacitors based on the first set of current values and a second set of three parameter values of a two-port model representation of the network of capacitors based on the second set of current values, and to determine values for the capacitors of the network of capacitors based on a relationship with the first and second sets of three parameter values.

21. A method for determining an occupancy status of a vehicle seat, the method including:
disposing a pair of electrodes spaced from one another in a vehicle seat;
modeling current pathways formed by interaction of an object with an electric field between the pair of electrodes as a network of capacitors;
applying a set of alternating current voltages to the pair of electrodes and measuring a resulting first set of current values at the pair of electrodes;
adjusting a physical parameter of one of the electrodes;
applying the set of alternating current voltages to the pair of electrodes with the one electrode having the adjusted parameter and measuring a resulting second set of current values at the pair of electrodes;
determining values of the capacitors of the network of capacitors based on the first and second sets of current values; and
determining an occupancy status of the vehicle seat based on the values of the capacitors.

22. The method of claim 21, wherein adjusting the physical parameter includes adjusting one of a surface area of the one electrode and a position of the one electrode.

23. The method of claim 21, wherein modeling current pathways includes modeling the network of capacitors as a coupling capacitance between one electrode of the pair and the object, a coupling capacitance between the other electrode of the pair, a coupling capacitance between the pair of electrodes, and a coupling capacitance between the object and a chassis of the vehicle.

24. The method of claim 21, wherein the alternating current voltages have a frequency less than one megahertz such that when the object is a human body, the human body acts as an electrical short.

25. The method of claim 21, wherein determining the values of the capacitors includes:
determining a first set of three parameter values of a two-port model representation of the network of capacitors based on the first set of current values
determining a second set of three parameter values of a two-port model representation of the network of capacitors based on the second set of current values; and
determining values for the capacitors of the network of capacitors based on a relationship with the first and second sets of three parameter values.

26. A vehicle seat occupant recognition system comprising
a pair of electrodes disposed in a vehicle seat and spaced from one another;
means for modeling current pathways formed by interaction of an object with an electric field formed between the pair of electrodes as a network of capacitors;
means for applying a set of alternating current voltages to the pair of electrodes and measuring a resulting first set of current values at the pair of electrodes;
means for adjusting a parameter of one of the electrodes;
means for applying the set of alternating current voltages to the pair of electrodes with the one electrode having an adjusted parameter and measuring a resulting second set of current values at the pair of electrodes;
means for determining values of the capacitors of the network of capacitors based on the first and second sets of current values; and
means for determining an occupancy status of the vehicle seat based on the values of the capacitors.

* * * * *